(12) United States Patent
Ouellette (10) Patent No.: US 6,318,935 B1
(45) Date of Patent: *Nov. 20, 2001

(54) BRAKING SYSTEM FOR AIR CONVEYORS (75) Inventor: Joseph F. Ouellette, St. Louis, MO (US)

(73) Assignee: Ouellette Machinery Systems, Inc., Fenton, MO (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/197,648

(22) Filed: Nov. 23, 1998

(51) Int. Cl.[7] .................................................. B65G 51/20
(52) U.S. Cl. ................................. 406/83; 406/86; 406/88; 198/836.3
(58) Field of Search ................................ 406/83, 86, 88; 198/345.1, 459.6, 463.4, 836.3, 633, 448

(56) References Cited

U.S. PATENT DOCUMENTS

| | | | |
|---|---|---|---|
| 1,855,767 | * 4/1932 | Neuman | 198/448 |
| 3,844,405 | * 10/1974 | Shuford | 198/836.3 |
| 4,037,711 | * 7/1977 | Heisler | 198/452 |
| 4,096,939 | * 6/1978 | Riggs et al. | 198/460.1 |
| 4,487,309 | * 12/1984 | Dorner | 198/463.4 |
| 4,662,500 | * 5/1987 | Agnew | 193/40 |
| 4,724,947 | * 2/1988 | Opperthauser | 198/433 |
| 4,796,746 | * 1/1989 | Bergstrom et al. | |
| 4,966,272 | * 10/1990 | Raudat | 198/446 |
| 5,099,979 | * 3/1992 | Kehrel | 198/345.1 |
| 5,211,280 | * 5/1993 | Houde | 198/836.3 |
| 5,291,988 | * 3/1994 | Leonard | 198/836.3 |
| 5,322,160 | * 6/1994 | Markiewicz et al. | 198/836.3 |
| 5,421,678 | * 6/1995 | Aidlin et al. | 406/88 |
| 5,437,521 | 8/1995 | Ouellette . | |
| 5,542,789 | * 8/1996 | Ouellette | 406/88 |
| 5,611,647 | 3/1997 | Ouellette . | |
| 5,628,588 | 5/1997 | Ouellette . | |
| 5,706,933 | * 1/1998 | Ouellette | 198/836.3 |
| 5,749,698 | * 5/1998 | Miyoshi | 414/800 |
| 5,782,339 | * 7/1998 | Drewitz | 198/836.3 |
| 6,050,396 | * 4/2000 | Moore | 198/836.3 |

* cited by examiner

Primary Examiner—Christopher P. Ellis
Assistant Examiner—Richard Ridley
(74) Attorney, Agent, or Firm—Howell & Haferkamp LC (57) ABSTRACT A braking system is provided along one of a pair of guide rails of an air conveyor that transports plastic bottles along a pathway between the pair of guide rails. The braking system is selectively actuated to move into the pathway defined by the guide rails decreasing its width and positioning a stop of the braking system in the pathway where it will engage with bottles conveyed by the air conveyor slowing and eventually stopping the bottles.

24 Claims, 4 Drawing Sheets

BRAKING SYSTEM FOR AIR CONVEYORS

BACKGROUND OF THE INVENTION

(1) Field of the Invention

The present invention pertains to a braking system for air conveyors. In particular, the present invention provides a braking system along the guide rails of an air conveyor that transports plastic bottles along a pathway between the guide rails. The braking system is selectively actuated to move into the pathway defined by the guide rails decreasing its width and positioning a stop of the braking system in the pathway where it will engage with bottles conveyed along the pathway by the air conveyor slowing and eventually stopping the bottles.

(2) Description of the Related Art

Air conveyors are typically employed in the rapid transport of empty plastic bottles of the type having an annular rim or a neck ring at the base of the bottle neck. A typical air conveyor includes a pair of flanges that are spaced from each other defining an elongated slot between the flanges. The spacing between the flanges is sufficiently large to enable a portion of the bottle just below the neck ring to pass through the spacing with the bottle suspended from the top surfaces of the flanges by the neck ring engaging on the top surfaces. A series of air ducts are positioned along the flanges above and/or below the elongated slot. A plenum of the air conveyor supplies a flow of air to the air ducts. The air ducts are oriented so that air ejected from the ducts will contact the plastic bottles pushing the bottles along the pathway defined by the elongated slot with the neck rings of the bottles sliding along the top surfaces of the spaced flanges.

Preferably, air conveyors transport bottles in closely spaced succession and at a substantial speed. A typical air conveyor is constructed with both straight sections and curved sections in order to transport the succession of bottles from one area to another. Air conveyors often have guide rails positioned below the slot defined by the pair of flanges. Pairs of guide rails positioned on opposite sides of the slot follow the conveyor path defined by the slot. The guide rails are usually spaced further apart from each other than are the flanges to allow the width of a bottle suspended from the flanges to pass easily between the guide rails. The guide rails limit the side-to-side movement of the succession of bottles conveyed by the air conveyor and thereby limit the extent to which the body of the bottle can swing outwardly or transversely from the air conveyor path, for example when the air conveyor rounds a curve, and thereby avoids a bottle neck or neck ring potentially becoming jammed in the air conveyor slot and stopping the succession of conveyed bottles.

With a typical air conveyor being capable of transporting a large succession of plastic bottles at a considerable speed, problems can be encountered when a large succession of bottles are stopped and accumulated at the end of the air conveyor. In prior art air conveyors, the leading bottle in a succession would be stopped at the end of the air conveyor by a selectively operated gate mechanism. This first bottle stopped by the gate mechanism would in turn stop all subsequent bottles that trailed it in the line of succession of bottles conveyed by the air conveyor. Thus, this first stop bottle would have a force exerted on it by each of the trailing bottles conveyed by the conveyor mechanism. With a long line of succession of bottles, the force exerted on the first stopped bottle could be sufficient to damage the bottle. In a like manner, the second 20 bottle in the sequence has a force exerted on it by each of its trailing bottles. This force could also be sufficiently large in a long succession of bottles to cause damage. In this manner, several bottles at the forward end of a long succession of bottles stopped by the conveyor system could be damaged. In addition, when the air conveyor is conveying a large number of bottles in a group and they come to one or more bottles stopped by the gate of the air conveyor, the impact of the large group of conveyed bottles with the stopped bottle or bottles can cause the forward most stop bottle to be forced through the gate.

To overcome this problem, a mechanism is needed that not only engages with the forward most bottle in a succession of bottles to stop the succession of bottles, but engages with and brakes several of the bottles in the succession of bottles. In addition, it is desirable that the mechanism have a simplified construction that would enable it to be retrofit to an existing air conveyor at several spots along the length of the air conveyor to enable stopping groups of bottles conveyed by the air conveyor at controlled points along the air conveyor length to thereby control the number of bottles that would accumulate at any one position along the length of the air conveyor where the succession of conveyed bottles are stopped.

SUMMARY OF THE INVENTION

The conveyor braking system of the invention can be employed with virtually any type of conveyor system that conveys a succession of articles along a flow path, where the succession of articles can be engaged by the braking system from opposite sides of the flow path. In the operative environment of the braking system to be described, the system is employed on an air conveyor that transports plastic bottles. The bottles are of a conventional type with each bottle having a neck at its upper end and an annular shoulder below the neck that defines the upper portion of the body of the bottle. An outwardly projecting annular rim or neck ring is positioned below the neck of the bottle and above the bottle shoulder.

The air conveyor with which the braking system of the invention is described employs a pair of spaced flanges through which the neck and neck ring of the bottle project. The neck ring rests on top surfaces of the spaced flanges suspending the shoulder and body of the bottle below the flanges. The air conveyor includes a series of air ducts that direct a supply of air against the bottle causing the bottle to move along the length of the air conveyor with the neck ring of the bottle sliding along the top surfaces of the flanges. Typical air conveyors of this type are described in the U.S. Patents of Ouellette U.S. Pat. No. 5,437,521, issued Aug. 1, 1995, and U.S. Pat. No. 5,611,647 issued Mar. 18, 1997, both which are assigned the assignee of the present invention and incorporated herein by reference.

Air conveyors typically include a framework that supports the conveyor. They also often include guide rails that are support from the framework or suspended from the air conveyor in positions just below the air conveyor slot. The guide rails are provided in pairs that extend along the length of the conveyor with a spacing between the pair of guide rails that is centered below the spacing between the air conveyor slot. The spacing between the guide rails is usually slightly larger than the body of the bottles to be conveyed by the air conveyor. The guide rails limit the extent to which bottles conveyed by the air conveyor can rock side-to-side or transversely to their direction or path of conveyance.

The braking system of the invention is designed to enable its simple addition to an existing air conveyor system. The braking system is designed to be mounted adjacent the guide rails of the air conveyor. The system includes at least one stop that is mounted adjacent to one of the guide rails of the pair of guide rails of the air conveyor system. The stop includes an actuator that is selectively actuated to move the stop transversely toward and away from the spacing between the air conveyor guide rails. Thus, when the stop is actuated it moves into the pathway defined by the pair of guide rails of the air conveyor, reducing the transverse spacing or width of this pathway. Depending on the extent to which the stop moves into the pathway, the stop can come into engagement with the body of a bottle being conveyed along the pathway gripping the bottle between the stop and the guide rail on the opposite side of the pathway, or the stop can reduce the width of the pathway to the extent where the body of a bottle conveyed through the pathway will contact both the stop and the guide rail on the opposite side of the pathway with the engagement on the opposite sides of the bottle gradually braking the bottle and slowing its speed of conveyance as it passes along the stop.

The stop is constructed of first and second elongated bar sections that are connected end to end by a pivot joint. A first end, or upstream end of the first elongated bar section is mounted adjacent one of the pair of air conveyor guide rails by a pivot pin. The pivot pin extends through an oblong hole in the first end of the first bar section. The oblong hole extends in a direction along a center axis of the first bar section.

The second bar section has a pair of oblong holes therethrough adjacent its opposite ends. However, the oblong holes or slots of the second bar section extend in directions that are oriented at an angle to the center axis of the second bar section. Posts pass through each of the angled oblong slots of the second bar section mounting that section adjacent the one guide rail of the air conveyor and positioned downstream of the conveyor path from the first bar section.

An actuator is mounted between the second bar section of the stop and a stationary support of the air conveyor guide rail. The actuator of the preferred embodiment is a pneumatic actuator that is selectively supplied with pressurized air at its opposite ends to selectively extend and retract the length of the actuator. When the actuator is retracted, reducing its length, it pulls both the first and second bar sections of the stop toward the adjacent guide rail. The first and second bar sections of the stop extend along the length of the adjacent guide rail and do not project into the conveyor path between the pair of guide rails. Actuation of the actuator, causing its length to be extended, moves the second bar section in a translatory movement out into the spacing between the pair of guide rails. This movement of the second bar section also causes the first bar section to move in a pivoting movement about the pivot pin at its upstream end out into the spacing between the pair of guide rails. This movement of the two bar sections reduces the spacing between the opposite guide rail and the two bar sections of the stop, which also reduces the width of the conveyor pathway through which the bodies of the bottles are conveyed by the air conveyor. As bottles are conveyed along the conveyor pathway and begin to pass between the length of the first bar section of the stop and the opposite guide rail, the spacing between the first bar section and the opposite guide rail begins to decrease as the bottles continue in a downstream direction. The decreasing width or spacing between the stop and the opposite guide rail continues until the bottles reach the second bar section where the spacing between the second bar section of the stop and the opposite guide rail is the smallest. As the bottles continue to be conveyed downstream between the second bar section and the opposite guide rail, the engagement of the bodies of the bottles between the second bar section and opposite guide rail gradually slows the speed of conveyance of the bottles and, depending on the spacing between the second bar section and the opposite guide rail and the width of the bodies of the bottles, can gradually be brought to a complete stop by the braking system of the invention.

BRIEF DESCRIPTION OF THE DRAWINGS

Further objects and features of the present invention are revealed in the following detailed description of the preferred embodiment of the invention and in the drawing figures, wherein.

DESCRIPTION OF THE PREFERRED EMBODIMENT

Figure 1:
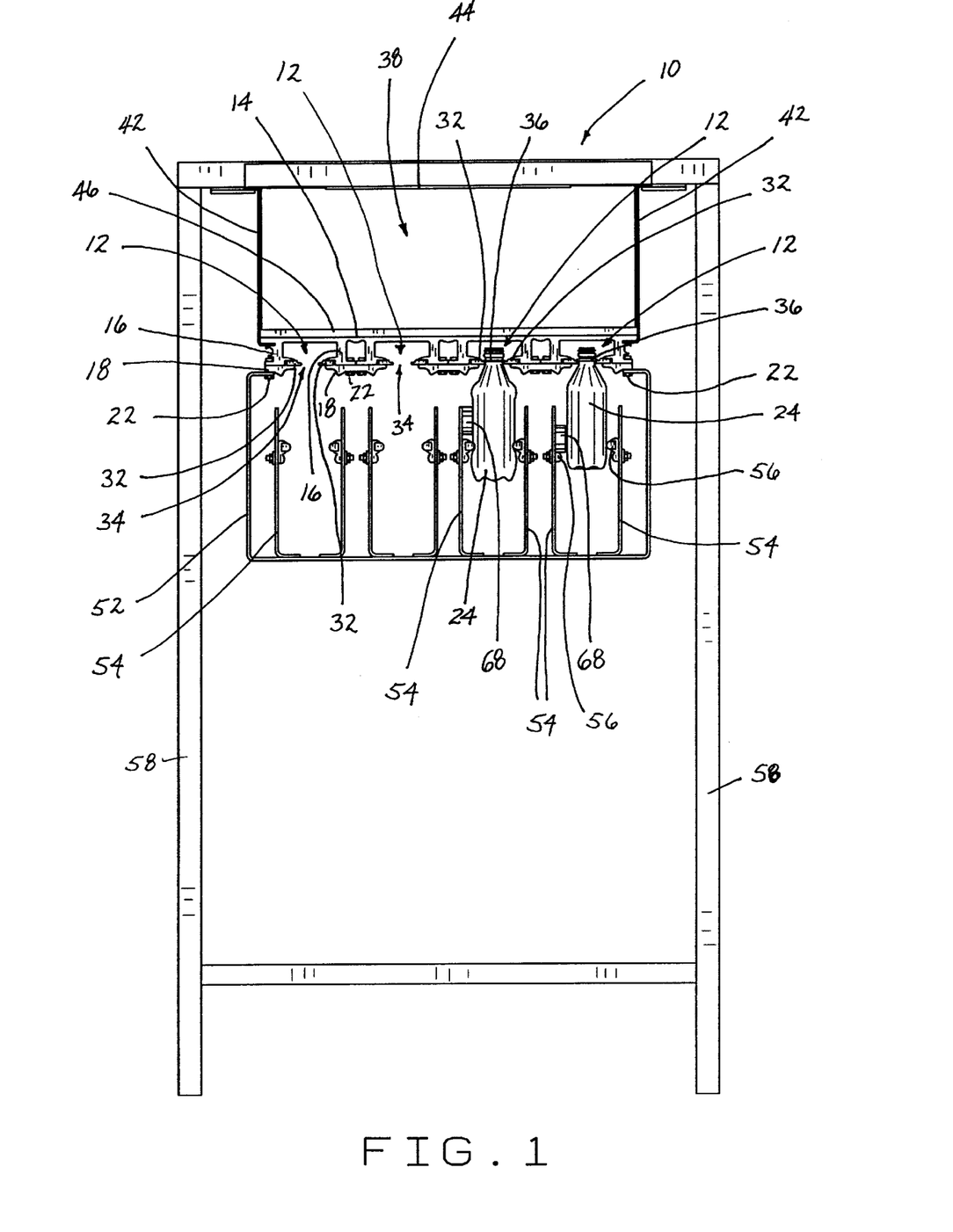
FIG. 1 is an end elevation view of a four lane air conveyor system where the braking system of the invention is installed on two of the four lanes.
Figure 2:
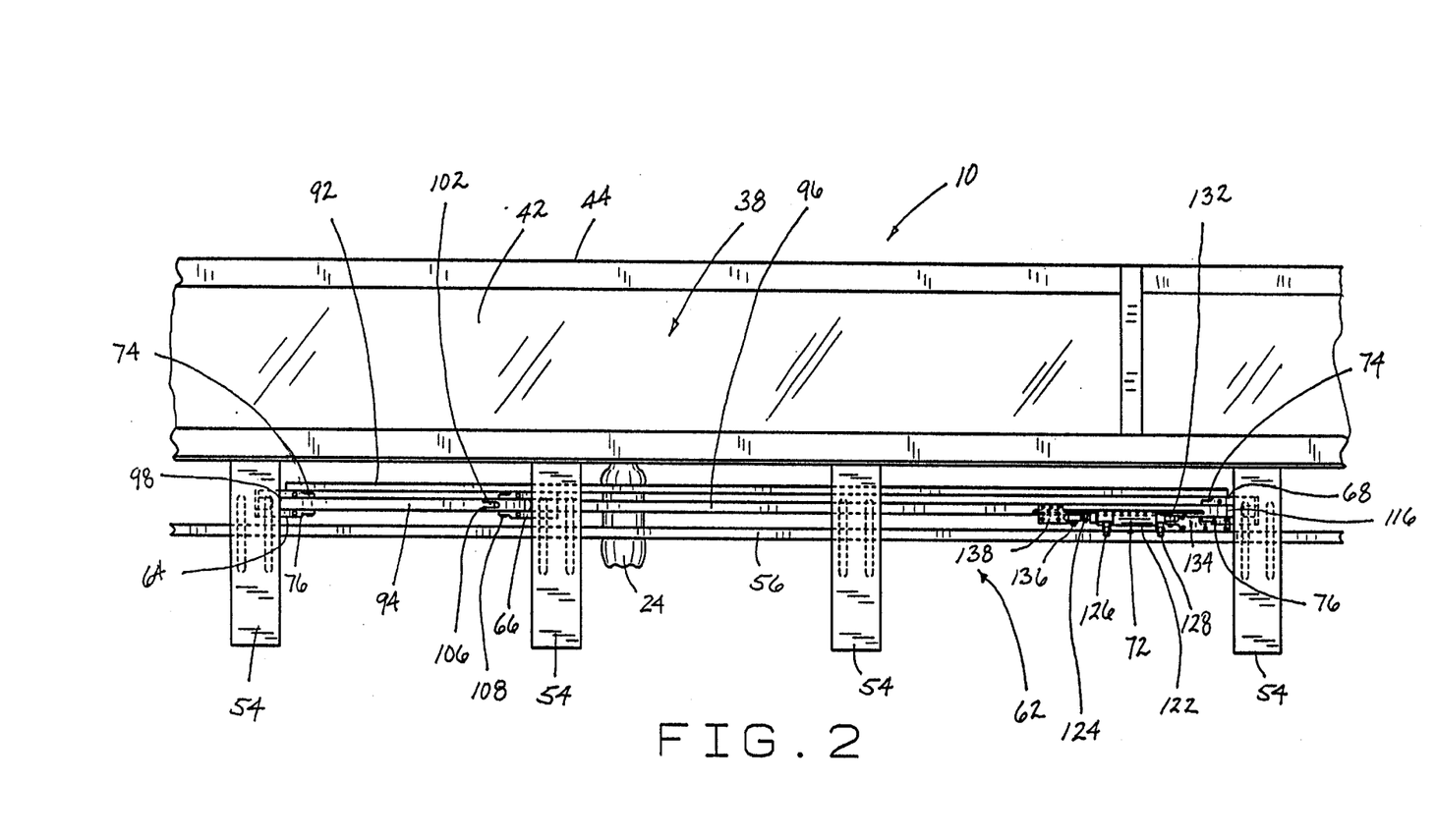
FIG. 2 is a partial side elevation view of the braking system of the invention installed above a guide rails of an air conveyor, although it could also be mounted below the guide rail.

FIGS. 1 and 2 show a multi-channel air conveyor that serves as the operative environment of the present invention. Although a multi-channel air conveyor is shown, it should be understood that the present invention may be employed with a single channel air conveyor. FIG. 1 shows an end elevation view of the air conveyor 10. The conveyor includes four conveyor channels 12, each having a generally inverted U-shaped configuration with a top wall 14 and laterally spaced side walls 16. Together, the channel top wall 14 and the side walls 16 give each of the channels 12 their generally, inverted Ushaped configuration surrounding an interior volume of each conveyor channel. The side walls 16 of each conveyor channel have lower sections 18 connected to the upper side walls 16 by threaded fasteners 22. The lower sections 18 of the side walls have pluralities of air duct outlets (not shown) that extend through the conveyor channel side walls 16 and side wall lower sections 18. The configurations of the air duct outlets direct jets of air ejected from the outlets to strike bottle containers 24 conveyed by the air conveyors in the area of the shoulder of the bottles, thereby forcing the bottles to travel downstream along the length of the air conveyor. In viewing FIG. 2, the downstream direction is from left to right.

Each of the air duct outlets in the side wall lower sections 18 is fed with pressurized air directed through air conduits that pass through the upper side walls 16 of the conveyor channels. These air conduits extend from the top surface of the conveyor channel top walls 14 completely through the side walls 16 to the air ducts of the side wall lower sections 18. This construction of the air ducts and air conduits is employed in air conveyors of the type disclosed in the U.S. Patent of Ouellette, U.S. Pat. No. 5,628,588, issued May 13, 1997 and incorporated herein by reference.

Referring to FIG. 1, the interior volume of each of the channels 12 is comprised of an upper portion and a lower portion separated by pairs of laterally spaced, longitudinally extending flanges 32. Opposed pairs of flanges 32 extend from the opposed side walls 16 of each of the channels 12 into the interior volume of the channels and define slots 34 between each pair of flanges. The flanges 32 are held between the upper portions of the channel side walls 16 and the lower sections 18 of the channel side walls. Set screws (not shown) are employed to secure the flanges 32 in their positions on the side walls 16. By loosening the set screws, opposed pairs of flanges 32 can be adjustably positioned laterally toward or away from each other to adjust the lateral widths of the slots 34. In a bottle conveyor of the type shown in FIGS. 1 and 2, the lateral widths of the slots 34 is adjusted to be sufficiently large to receive the neck of the bottle container 24 therein with the annular rim or neck ring 36 of the bottle container supported on the top surfaces of the flanges 34 and with the tapered shoulder and body of the bottle suspended below the pair of flanges.

An air plenum 38 extends longitudinally along the top wall 14 of the conveyor channels 12. The plenum 38 is an elongated hollow box comprised of a pair of side walls 42 and a top wall 44 that surround an interior volume of the plenum. As shown in FIG. 1, the plenum includes a connecting plate 46 that attaches adjacent bottom walls of the plenum. The connecting plate 46 is attached to the top wall 14 of the conveyor channels 12 and to the side walls 42 of the plenum. The connecting plate is employed in connecting together adjacent lengths of the air conveyor end to end. The connecting plate is attached to the conveyor channels top wall 14 by threaded fasteners (not shown) and is also connected to the plenum side walls 42 by threaded fasteners (not shown). When the connecting plate overlays air conduits of the conveyor channels 12, holes are provided through the plate in order to maintain communication of the pressurized air in the air plenum 38 with the conveyor channel air conduits and air ducts.

Suspended below the air conveyor 10 are a plurality of brackets 52. As shown in FIG. 1, each bracket 52 has a general U-shaped configuration and its top ends are attached to the undersides of the outer most side wall lower sections 18 of the conveyor channels 12 by threaded fasteners. The brackets 52 are spacially arranged along the length of the air conveyor 10. As shown in FIG. 1, pairs of supports 54 are attached to the bottom of the brackets 52. Each pair of supports 54 projects upwardly and is centered below the slots 34 of each of the conveyor channels 12. The spacing between each pair of supports 54 is sufficiently large to provide ample clearance for a bottle container 24 to pass therethrough as is shown in FIG. 1.

Guide rails 56 are mounted to the supports 54. Pairs of guide rails 56 are positioned within the pairs of supports 54 mutually opposing each other. The guide rails 56 extend along the length of the air conveyor 10 and can be provided in sections that are positioned end to end along the length of the air conveyor 10 in the same manner that sections of the air conveyor are positioned end to end. The guide rails 56 limit the extent of side to side movement of bottles 24 conveyed by the air conveyor 10 and prevent bottles from becoming jammed in the air conveyor by excessive side to side movement.

The air conveyor 10, the series of brackets 52 and the supports 54 and guide rails 56 are all suspended from a framework 58. The framework 58 extends along and supports the entire length of the air conveyor 10. Although only a short, straight length of the air conveyor 10 is shown in FIGS. 1 and 2, air conveyors are constructed with substantial lengths that can curve from side to side and incline upwardly and downwardly along their lengths.

The air conveyor described to this point is conventional and many of the component parts of the air conveyor described are found in various different types of air conveyors. It should be understood that the air conveyor described is only one operative environment of the braking system and that the braking system may be employed in different types of air conveyors having constructions that are different from the construction of the air conveyor described herein. The air conveyor 10 is only one operative environment of the braking system and the braking system is not limited to use with air conveyors of the type described.

The braking system of the invention is designed to enable it to be easily retrofit to existing air conveyors by attaching it to the guide rail brackets 52 and supports 54 of an existing air conveyor, or by including brackets and supports with the braking system that enable it to be attached to the side walls 16 of the conveyor channels 12. Although the braking system will be described as being employed with a multi-channel air conveyor, it is equally well-suited for use with a single channel air conveyor.

The braking system of the present invention is basically comprised of a stop 62 that is supported by three mounts 64, 66, 68 adjacent a guide rail of an air conveyor channel, and an actuator 72 that selectively moves the stop 62 a short distance into the spacing between opposed guide rails of the conveyor channel to reduce the spacing of the conveyor pathway between the guide rails and stop bottles conveyed through this portion of the pathway. FIG. 1 shows a downstream mount 68 of the three mounts of the braking system on one of the supports 54 of the conveyor guide rails 56. FIG. 1 illustrates the ability of mounting the braking system at different elevations adjacent the guide rails 56 in order to best position the braking system for engagement with a generally flat portion of the bottle body to obtain the optimum performance of the braking system. In the preferred embodiment of the invention, it is only necessary to mount the braking system on one side of the pathway defined between the pair of opposed guide rails 56. When the stop 62 of the braking system is extended outwardly into this pathway by actuation of the actuator 72, the spacing between the braking system stop and the opposite guide rail is reduced to the extent that a bottle 24 cannot pass through the pathway and is stopped. Pairs of the braking systems to be described could be mounted adjacent the pairs of guide rails 56 that define each pathway of the air conveyor, but only one braking system is needed to operate properly and therefore only one braking system mounted on one side of the pathway defined by the guide rails 56 will be described.

Figure 3:
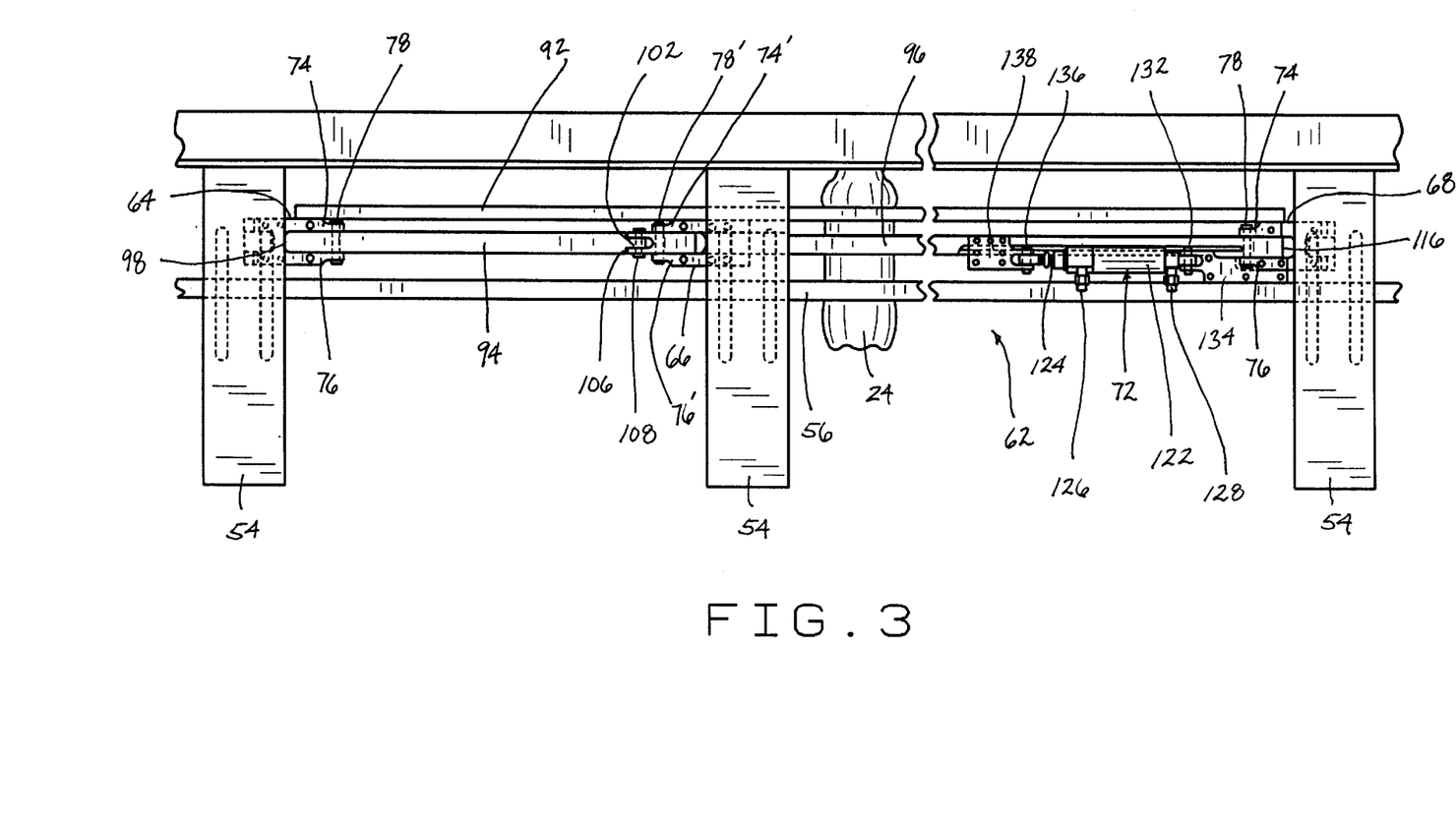
FIG. 3 is a partial fragmented, side elevation view of the braking system of FIG. 2.

FIG. 2 shows a side view of the braking system of the invention installed along a length of the air conveyor 10 and FIG. 3 shows a fragmented view of the side of the conveyor shown in FIG. 2 and also shows an enlargement of the component parts of the braking system. Again, it is pointed out that the braking system is installed on one side of the pathway defined by opposed guide rails 56 and one guide rail of the pair of opposed guide rails is positioned on the opposite side of the conveyor pathway from the braking system.

Figure 4:
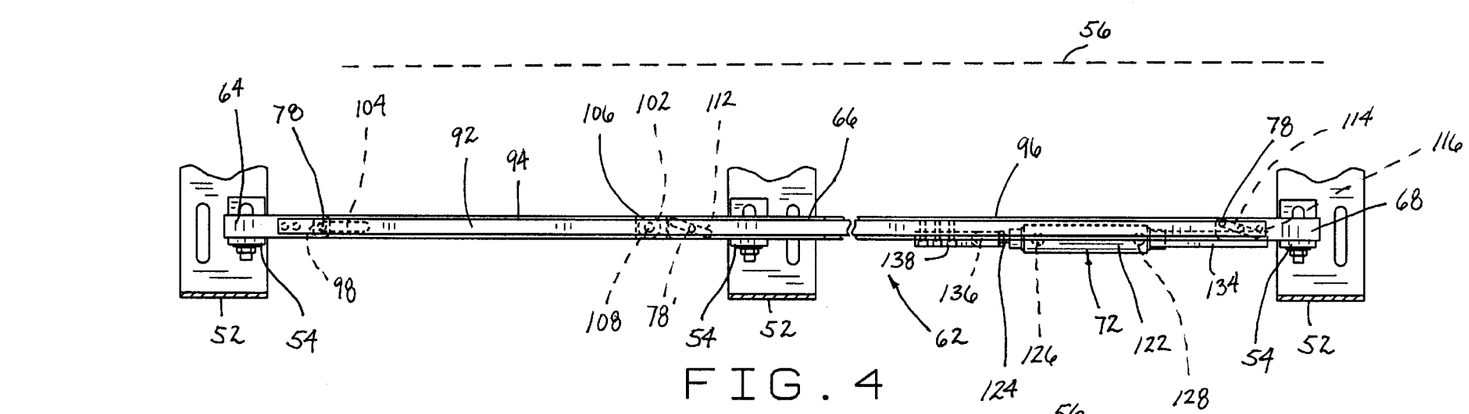
FIG. 4 is a partial, fragmented, plan view of the braking system in its retracted position relative to the guide rails.
Figure 5:
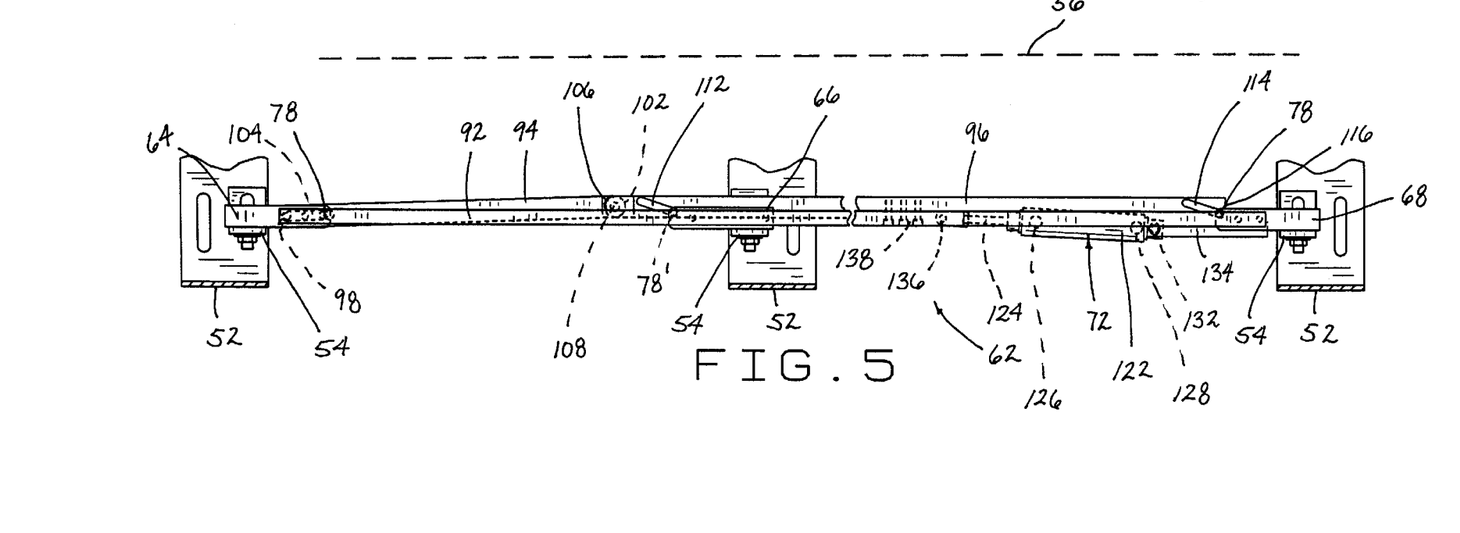
FIG. 5 is a partial, fragmented, plan view of the braking system extended relative to the guide rails.

The three mounts of the braking system include an upstream mount 64, an intermediate mount 66, and a downstream mount 68. Each of the mounts is secured to one of the air conveyor supports 54 just above the guide rail 56 supported by the support. Each of the mounts could also be mounted below the guide rail if required by the shape of the bottles. The upstream and downstream mounts have basically the same construction and the construction of the intermediate mount is only slightly different from the other two. The upstream mount 64 is mounted to its support 54 in a reversed orientation from the orientations of the intermediate mount 66 and the downstream mount 68. Because the upstream and downstream mounts have the same basic construction, only the construction of the upstream mount 64 will be described with it being understood the component parts of the downstream mount 68 are the same and are identified by the same reference numbers. The upstream mount 64 has a general C-shape with an upper arm 74 and lower arm 76 that are vertically spaced from each other. The spacing is sufficient to accommodate a portion of the stop 62 therein, as will be described. The opposite end of the mount 64 from its projecting arms 74, 76 is mounted to the support 54 on the same side of the support as the guide rail 56. This positions the mount just above the guide rail. As shown in FIGS. 4 and 5, the mount has a transverse width that is substantially equal to that of the guide rail 56 so that it does not project out into the pathway of the conveyed bottles any more than does the guide rail. The mount is preferably attached to the support 54 by threaded fasteners (not shown). At the opposite end of the mount 64, a pivot pin 78 extends through the distal ends of the arm 74, 76 across the spacing between the arms.

The intermediate mount 66 is also attached to one of the guide rail supports 54 but in an orientation that is the reverse of that of the upstream mount 64. Like the upstream mount, the intermediate mount 66 has an upper arm 74' and lower arm 76' separated by a vertical spacing and a pivot pin 78' spanning the spacing at the distal ends of the arms. However, the intermediate mount 66 differs from both the upstream mount 64 and the downstream mount 68 in that it is not formed in a general C-shape. Instead it is formed with the upper and lower arms 74, 76 being separated from each other by the spacing between the arms. Unlike the upstream mount 64 and downstream mount 68, the spacing between the arms of the intermediate mount 66 extends along the entire length of the mount 66. This enables sections of the stop 62 to be described to be positioned between the two arms 74', 76' of the intermediate mount 66. As an alternative, the arms of the intermediate mount 66 could be formed as one-piece with a slot extending along the entire length of the mount that is dimensioned to receive sections of the stop to be described within the slot and between the two arms. Like the upstream mount 64, the two separate arms 74', 76' of the intermediate mount 66 are attached to the guide rail support 54 by threaded fasteners (not shown).

The downstream mount 68 is similar to the upstream mount 64 except that its orientation mounted on the guide rail support 54 is reversed from the upstream mount. It also includes a pair of arms 74, 76 that are separated by a vertical spacing. A pivot pin 78 passes through the arms at their distal ends and spans the spacing between the arms. The mount 68 is secured to the guide rail support 54 by threaded fasteners (not shown).

A reinforcement rod 92 extends across the tops of the three mounts 64, 66, 68 and is secured thereto by threaded fasteners (not shown). The reinforcement rod 92 adds rigidity to the braking system.

The stop 62 of the braking system that is selectively extended into and retracted from the pathway defined by the pair of guide rails 56 is constructed of first 94 and second 96 elongated, articulated bar sections that together form a rail similar to the guide rails. The two bar sections 94, 96 have transverse width and vertical height dimensions substantially the same as those of the guide rails 56. Referring to FIGS. 3–5, the first bar section 94 has opposite upstream 98 and downstream 102 ends. A hole 104 passes vertically through the first bar section 94 adjacent its upstream end 98. As seen in FIGS. 4 and 5, the hole 104 has an oblong shape and extends along the end of the first bar section 94 in a direction generally parallel with the length of the first bar section. The opposite downstream end 102 of the first bar section is connected by an articulation joint to the upstream end 106 of the second bar section 96. The downstream end 102 of the first bar section is formed with a center pivot knuckle and the upstream end 106 of the second bar section is formed with a pair of vertically spaced knuckles that receive the center knuckle of the first bar section therebetween. A pivot pin 108 passes through these three knuckles and provides the pivot connection of the articulation joint between the two bar sections. An oblong slot 112 also passes vertically through the second bar section 96 adjacent its upstream end 106. A similar oblong slot 114 passes vertically through the second bar section 96 adjacent its downstream end 116. Both oblong slots 112, 114 have lengths that extend in a direction oriented at an angle relative to the center axis of the length of the second bar section 96.

The pivot pin 78 through the upstream mount 64 also passes through the hole 104 at the upstream end 98 of the first bar section 94. The pivot pin 78' of the intermediate mount 66 passes through the oblong slot 112 at the upstream end 106 of the second bar section 96. The pivot pin 78 of the downstream mount 68 passes through the oblong slot 114 at the downstream end 116 of the second bar section 96. In this manner, the two bar sections 94, 96 of the stop 62 are supported by the three mounts 64, 66, 68 above the guide rail 56 of the air conveyor. Again, they could also be mounted below the guide rails.

The actuator 72 in the preferred embodiment of the invention is a linear actuator. In the preferred embodiment, the linear actuator is a double-acting pneumatic piston and cylinder. Other types of linear actuators may be employed as the actuator for the braking system. In addition, it is not necessary that the actuator be a linear actuator as a rotary actuator may also be employed to operate the braking system. The actuator includes a cylinder 122 with a piston (not shown) mounted therein for reciprocating movement. A piston rod 124 extends from the cylinder. A retraction air inlet 126 is provided at one end of the cylinder and an extension air inlet 128 is provided at the opposite end of the cylinder. The right-hand end of the cylinder 122 as viewed in FIGS. 2–5 is mounted by a pivot connection 132 to a brace 134 that in turn is secured to the mount 68 at the downstream end, or right-hand end of the braking system as shown in the drawing figures. The piston rod 124 is connected by a pivot connection 136 to a brace 138 that is secured to the second bar section 96 of the braking system stop. Two separate hoses (not shown) are connected to the retraction air inlet 126 and the extension air inlet 128 of the cylinder 122 and are selectively supplied with air to control the retraction of the piston rod 124 into the cylinder 122 and the extension of the piston rod from the cylinder, respectively.

The operation of the braking system is illustrated in FIGS. 4 and 5. In FIGS. 4 and 5, the guide rail 56 opposite the braking system is represented by a dashed line with the path of conveyance of bottle containers being between the braking systems shown in the drawing figures and the dashed line representation of the guide rail 56. The direction of conveyance from the upstream end to the downstream end of the path of conveyance is from left to right in the drawing figures.

FIG. 4 shows the braking system in its retracted position relative to the guide rails 56. From this view, it can be seen that neither the first bar section 94 or the second bar section 96 of the stop extends into the pathway defined between the pair of guide rails 56. Therefore, the braking system would not interfere with the free conveyance of bottles through the pathway defined by the guide rails.

FIG. 5 shows the positions of the first bar section 94 and the second bar section 96 when air pressure has been supplied to the extension air inlet 128 of the actuator cylinder 122. This causes the piston rod 124 to be extended from the cylinder 122. The extension of the piston rod causes the second bar section 96 to move in a translatory movement controlled by the sliding of the intermediate mount pin 78' and downstream mount pin 78 through the oblong slots 112, 114 at the opposite, ends of the second bar section. The angled orientation of the two oblong slots 112, 114 at the opposite ends of the second bar section 96 relative to its center axis causes the second bar section 96 to move in a translatory movement in the upstream direction, or to the left as viewed in FIG. 5, while simultaneously moving transversely relative to the flow path of the conveyed bottles between the guide rails 56, thus reducing the spacing between the opposite guide rail 56 shown as a dashed line in FIG. 5 and the second bar section 96. The second bar section 96 moves in this translatory manner until the two pins 78', 78 of the intermediate mount 66 and the downstream mount 68 reach the ends of the angled oblong slots 112, 114 as shown in FIG. 5.

As the second bar section 96 moves in its translatory movement, it imparts motion to the first bar section 94 due to the articulated joint connection provided by the pivot pin 108 connecting these two sections. The downstream end 102 of the first bar section 94 follows the translatory movement of the upstream end 106 of the second bar section 96 due to the articulating connection provided by the pivot pin 108. However, the movement of the upstream end 98 of the first bar section 94 is controlled by the pivot pin 78 of the upstream mount 64 passing through the oblong hole 104 and the orientation of the hole along the center axis of the first bar section 94. As the first bar section 94 is caused to move to the left or in an upstream direction by the movement of the second bar section 96, the hole 104 slides along the pivot pin 78 of the upstream mount 64 and causes the upstream end 98 of the first bar section to pivot about the pin. This gives the first bar section 94 an angled orientation relative to the guide rail 56 opposite the braking system. In addition, the angled orientation of the first bar section 94 causes the transverse width of the flow path of the conveyed bottles to gradually decrease as that flow path extends downstream from the upstream end 98 of the first bar section to its downstream end 102.

It can be seen from FIG. 5 that as bottles are conveyed in the downstream direction with the first and second bar sections 94, 96 of the stop extended, the spacing between the bottle and the opposite guide rail 56 represented by the dashed line in 56 and between the bottle and the first and second bar sections 94, 96 gradually decreases until the bottle reaches the articulation joint 108 between the first and second bar sections. This gradual decrease in the spacing functions to gradually slow the speed of the bottle being conveyed past the extended braking system until it reaches the second bar section 96 where the friction force between the second bar section and the guide rail represented by the dashed line on opposite sides of the conveyed bottle gradually brings the bottle to a stop. Because subsequently conveyed bottles will be gradually slowed, and stopped in the same manner, the earlier described problems associated with prior art bottle braking gates such as damaging the forward most stopped bottles or forcing these bottles through the braking gates are eliminated.

To again start the stream of conveyed bottles, the air supply to the extension air inlet 128 is removed and air is supplied to the retraction air inlet 126 causing the piston rod 124 to be retracted back into the cylinder 122. This pulls the first bar section 94 and second bar section 96 to the right, or in the downstream direction, causing them to move to their positions shown in FIG. 4 where they are both positioned outside the spacing between the opposing pairs of guide rails 56.

Although in the preferred embodiment of the invention the stop is constructed of first and second articulated bar sections 94, 96, a variation of the braking system could include a single bar section with its upstream end mounted as the upstream end of the first bar section 94 and the downstream end mounted as the downstream end of the second bar section 96 in the abovedescribed embodiment, thus eliminating the articulation joint between the two sections and the mounting of the second section to the intermediate mount 66.

While the present invention has been described by reference to a specific embodiment, it should be understood that modifications and variations of the invention may be constructed without departing from the scope of the invention defined in the following claims.

What is claimed:

1. A braking apparatus for a conveyor that conveys articles having width dimensions along a conveyor path, the braking apparatus comprising:

a guide rail and at least one stop positioned adjacent each other with a spacing between the guide rail and the stop, the spacing defining the pathway between the guide rail and stop for the conveyance of the articles therethrough;

an actuator connected to the one stop, the actuator having means to move the one stop toward the guide rail to a first position of the stop relative to the guide rail where the spacing between the guide rail and the stop is smaller than the width dimensions of the articles thereby preventing the conveyance of articles in the pathway, and to retract the one stop away from the guide rail to a second position of the stop relative to the guide rail where the spacing between the guide rail and stop is larger than the width dimensions of the articles thereby permitting the conveyance of articles along the pathway; and the stop is comprised of a pair of elongated bars.

2. A braking apparatus for a conveyor that conveys articles having width dimensions along a conveyor path, the braking apparatus comprising:

a guide rail and at least one stop positioned adjacent each other with a spacing between the guide rail and the stop, the spacing defining the pathway between the guide rail and stop for the conveyance of the articles therethrough;

an actuator connected to the one stop, the actuator having means to move the one stop toward the guide rail to a first position of the stop relative to the guide rail where the spacing between the guide rail and the stop is smaller than the width dimensions of the articles thereby preventing the conveyance of articles in the pathway, and to retract the one stop away from the guide rail to a second position of the stop relative to the guide rail where the spacing between the guide rail and stop is larger than the width dimensions of the articles thereby permitting the conveyance of articles along the pathway; and the one stop is comprised of first and second articulated sections.

3. A braking apparatus for a conveyor, the braking apparatus comprising:

a guide rail and at least one stop positioned adjacent each other with a spacing between the guide rail and the stop, the spacing defining a pathway between the guide rail and stop for the conveyance of articles therethrough; and an actuator connected to the one stop, the actuator being selectively actuated to move the one stop toward the guide rail decreasing the spacing between the guide rail and the stop, and to retract the one stop from the guide rail reestablishing the spacing between the guide rail and the stop, the one stop having opposite first and second ends, the first end having a hole therethrough and a first pin passing through the hole and the second end having and oblong slot therethrough and a second pin passing through the oblong slot.

4. The braking apparatus of claim 3, wherein:

the one stop is comprised of first and second articulated sections, the first section is supported by the first pin for pivoting movement of the first section about the first pin in response to actuation of the actuator and the second section is supported by the second pin for translatory movement of the second section relative to the second pin in response to actuation of the actuator.

5. The braking apparatus of claim 4, wherein:

the one stop has a joint connecting the first and second sections and the second section has a second oblong slot therethrough adjacent the joint and a third pin passes through the second oblong slot.

6. The braking apparatus of claim 5, wherein:

the joint is a pivot connection between the first and second sections.

7. A braking apparatus for a conveyer that conveys articles having width dimensions along a conveyor path, the braking apparatus comprising:

a guide rail and at least one stop positioned adjacent each other with a spacing between the guide rail and the stop, the spacing defining the pathway between the guide rail and stop for the conveyance of the articles therethrough;

an actuator connected to the one stop, the actuator having means to move the one stop towards the guide rail to a first position of the stop relative to the guide rail where the spacing between the guide rail and the stop is smaller than the width dimensions of the articles thereby preventing the conveyance of the articles in the pathway, and to retract the one stop away from the guide rail to a second position of the stop relative to the guide rail where the spacing between the guide rail and stop is larger than the width dimensions of the articles thereby permitting the conveyance of the articles along the pathway;

a frame for supporting the one stop and the guide rail;

the actuator is connected between the one stop and the frame; and the frame includes a bracket and the bracket suspends the guide rail and the stop beneath the conveyor.

8. The braking apparatus of claim 7, wherein:

the conveyor is an air conveyor.

9. The braking apparatus of claim 3, wherein:

the one stop has a length with center axes extending along the length of the one stop at the opposite first and second ends, and the oblong slot extends along a line that is oriented at an angle relative to the center axis of the stop second end.

10. The braking apparatus of claim 9, wherein:

the hole through the first end of the stop is oblong and extends along a line that is parallel to the center axis of the stop first end.

11. The braking apparatus of claim 3, wherein:

the one stop is comprised of first and second articulated sections with first and second lengths and first and second axes extending along the first and second lengths, respectively, and the oblong slot in the second end of the stop has a length with an axis that is oriented at an angle relative to the axis of the second section.

12. The braking apparatus of claim 11, wherein:

the hole through the first end of the stop is oblong and has a length with an axis that is oriented parallel with the axis of the first section.

13. A braking apparatus for a conveyor, the apparatus comprising:

a pair of rails positioned on opposite sides of the conveyor and extending along the conveyor;

an actuator connected to at least one of the rails, the actuator being selectively actuated to move the one rail toward and away from the other rail;

a frame for supporting the pair of rails;

the one rail having opposite first and second ends, a hole passing through the first end and an oblong slot passing through the second end; and a first pin on the frame passing through the hole and a second pin on the frame passing through the oblong slot.

14. The braking apparatus of claim 13, wherein:

the one rail is comprised of first and second articulated sections with first and second lengths and first and second axes extending along the first and second lengths, respectively, the first section is supported by the first pin for pivoting movement of the first section about the first pin in response to actuation of the actuator and the second section is supported by the second pin for translatory movement of the second section relative to the second pin in response to actuation of the actuator.

15. The braking apparatus of claim 14, wherein:

the one rail has a joint connecting the first and second sections and the second section has a second pin oblong slot therethrough adjacent the joint and a third pin on the frame passes through the second oblong slot.

16. The braking apparatus of claim 14, wherein:

the oblong slot in the second end of the one rail has a length with an axis that is oriented at an angle relative to the axis of the second section.

17. The braking apparatus of claim 16, wherein:

the hole through the first end of the one rail is oblong and has a length with an axis that is oriented parallel with the axis of the first section of the one rail.

18. The braking apparatus of claim 1, wherein:

the pair of elongated bars are connected together by a pivot connection.

19. The braking apparatus of claim 1, wherein:

one of the pair of elongated bars is arranged parallel to the guide rail and the other one of the pair of elongated bars is obliquely angled relative to the guide rail when the stop is in the first position of the stop relative to the guide rail and the pair of elongated bars is arranged parallel to the guide rail when the stop is in the second position of the stop relative to the guide rail.

20. The braking apparatus of claim 1, wherein:

one of the pair of elongated bars has a pair of oblong slots with the slots positioned at opposite ends of the one bar.

21. The braking apparatus of claim 2, wherein:

the first articulated section is arranged parallel to the guide rail and the second articulated section is obliquely angled relative to the guide rail when the stop is in the first position of the stop relative to the guide rail and the first and second articulated sections are arranged parallel to the guide rail when the stop is in the second position of the stop relative to the guide rail.

22. The braking apparatus of claim 2, wherein:

the first articulated section has opposite ends and a pair of oblong slots with the oblong slots positioned at opposite ends of the first section.

23. The braking apparatus of claim 2, wherein:

the first and second articulated sections are connected together by a pivot connection.

24. The braking apparatus of claim 7, wherein:

the actuator is a linear actuator.

* * * * *